United States Patent [19]

Kitsuregawa et al.

[11] Patent Number: 5,101,408
[45] Date of Patent: Mar. 31, 1992

[54] ERROR COLLECTION METHOD FOR SORTER SYSTEM

[75] Inventors: Masaru Kitsuregawa, Chiba; Yasunori Kasahara, Kanagawa, both of Japan

[73] Assignees: Mitsubishi Denki K.K.; Masaru Kitusregawa, both of Tokyo, Japan

[21] Appl. No.: 435,026

[22] Filed: Nov. 13, 1989

[30] Foreign Application Priority Data

Nov. 10, 1988 [JP] Japan ................... 63-284716
Nov. 10, 1988 [JP] Japan ................... 63-284717

[51] Int. Cl.$^5$ ............................................. G06F 11/00
[52] U.S. Cl. ...................... 371/16.5; 371/12; 371/14
[58] Field of Search ............... 371/12, 14, 16.5, 29.1

[56] References Cited

U.S. PATENT DOCUMENTS

| | | | |
|---|---|---|---|
| 4,318,172 | 3/1982 | Yamada et al. | 364/200 |
| 4,414,643 | 11/1983 | Meyer | 364/900 |
| 4,644,539 | 2/1987 | Sato | 371/11 |
| 4,783,783 | 11/1988 | Nagai et al. | 371/12 |
| 4,835,671 | 5/1989 | Sato et al. | 364/186 |
| 4,852,092 | 7/1989 | Makita | 371/12 |
| 4,885,715 | 12/1989 | McCanny et al. | 364/728.01 |

OTHER PUBLICATIONS

IBM Technical Disclosure Bulletin, vol. 28, No. 4, Sep. 1985, pp. 1669-1670.

*Primary Examiner*—Jerry Smith
*Assistant Examiner*—Russell E. Cass
*Attorney, Agent, or Firm*—Kanesaka & Takeuchi

[57] ABSTRACT

An error collection method for a sorter system having n pipelined sort elements Pi ($i=1-n$) of the same type and n local memories Mi ($i=1-n$) each connected to the corresponding sort element and having a memory capacity of at least $2^{i-1}$ record length, which includes the steps of sorting in said sort elements when one of the sort elements detects a fault; reporting contents of an error to the upper structure; analyzing the error; and restarting sorting.

5 Claims, 6 Drawing Sheets

IRREGULAR ADDRESS
OCCURRENCE REPORTING BITS

63 : LOCAL MEMORY

ERROR COLLECTION METHOD FOR SORTER SYSTEM

BACKGROUND OF THE INVENTION

The present invention relates to error collection which is one of the functions to enhance reliability, availability and serviceability (RAS) of a sorter system.

A hardware sorter system employing a conventional error collection method such as described in Denshi Tsushin Gakkai Gijutsu Kenkyu Hokokusho (Shingaku Giho, Vol. 86, No. 170) CPSY-26 dated Sept. 26, 1986, is shown in FIGS. 7 and 8.

In FIG. 7, the hardware sorter system includes 18 sort elements 61 or $P_i$ (i=1-18) each of which consists of TTL ICs which are SSI and/or MSI mounted on a single substrate; a pipelined data stream 62 for connecting the sort elements through which data flows continuously in synchronism with a control clock; and local memories 63 or $M_i$ (i=1-18), for the first to 12th stage mounted with each $P_i$(i=1-n) or in the same substrate for the 13th and following stages separately mounted from $P_i$ (i=13-18) on each counterpart. The memory capacity $M_i$ of each local memory increases with the number of $M_i=32$ B×stages i as a function of $2^{i-1}$; e.g., $M_1=32\times2^0=32$ B (bytes), $M_2=32$ B×2=64 B, $M_3=32$ B×$2^2$=128 B, ..., $M_{17}=32$ B×$2^{16}$=2 MB, $M_{18}=32$ B×$2^{17}$=4 MB.

In FIG. 8, the hatched areas on the memory substrate indicate the memory portions. A sorter unit 64 consisting of the sort elements and local memories and a sorter driver 65 constitute a sorter system which consists of 29 substrates. The sorter system includes a control line 66 extending from the sorter driver 65 to each sort element 61 and a memory bus 67 being accessible for an external controller to the dual ports memories $M_{13}$-$M_{18}$.

In operation, the sorter system with 18 sort elements in FIG. 7 is able to sort $2^{18}$ or 262,144 (N=$2^{18}$) records. Finally, the data of N records long are sequentially inputted via the data way 62 to the first sort element $P_1$, where the first record is loaded in the local memory $M_1$. Then, the loaded record and the second record inputted are sorted, and after that a string 2 records long is outputted to the next sort element $P_2$. Secondly, the third and the fourth records are then sorted at the first sort element, followed by the fifth and sixth records. In this way, all the records are sorted in sets of 2, and some strings of 2 record length are outputted sequentially to the next sort element $P_2$. In the sort element $P_2$, the first string which consists of the first and the second record sorted at the first sort element $P_1$ is loaded in the local memory $M_2$. The loaded first string and the second string which is composed of the third and the fourth record sorted at the first sort element $P_1$ are sorted, and a string 4 records long is outputted to the next sort element $P_3$. In this way, two strings of a double record length are sorted in the sort element $P_2$, two strings of a quadruple record length are sorted in the sort element $P_3$, and generally two strings of a $2^{i-1}$ record length are sorted in the sort element $P_i$ along the data way 62. Two strings of a 131,072-record length are sorted in the 18th sort element $P_{18}$, and the sorted data of a 262,144 (=N)-record length is provided as a final output.

In the conventional error collection method, when a sort element becomes out of order, the types and characteristics of an error in a report to the upper structure increases with the number of sort element stages because of the pipeline connection of sort elements so that it is difficult to process the error. In addition, it is also difficult to determine the time at which the error is collected. For example, if there is a fault on the data bus between two sort elements, the bus parity check is useless during the collection of irregular fault information. Furthermore, if one of the LSI sort elements becomes out of order, the types and characteristics of an error increases with the number of sort element stages because of the pipeline connection of sort elements so that the process of a report to the upper structure becomes complicated. Moreover, because of the linear connection, pipeline parallel processing, a fault in a sort element disables the subsequent sort elements to perform sorting.

SUMMARY OF THE INVENTION

Accordingly, it is an object of the invention to provide an error collection method for a sorter system, by which it is easy to perform error process even though the types and characteristics increases with the number of sort element stages.

It is another object to provide an error collection method for a sorter system in which the bus parity check is useful during the collection of irregular fault information when there is a fault on a data bus between sort elements.

It is still another object to provide an error collection method for a sorter system, which makes it easy for the upper structure to analyze errors, thus not only expanding the RAS function but also simplifying the process of a report to the upper structure.

It is yet another object to provide an error collection method for a sorter system which is able to perform sorting even if a sort element on the way becomes out of order.

According to one aspect of the invention, there is provided an error collection method for a sorter system, which includes immediately interrupting sorting in sort elements in all the stages when one of the sort elements detect a fault which disables the sorting process; reporting the contents of an error to the upper structure; analyzing the error; and restarting sorting.

According to another aspect of the invention there is provided an error control method for a sorter system, which includes interrupting sorting in sort elements in all the stages upon completion of sorting when one of the sort elements detect a sort allowable error; reporting the contents of an error; analyzing the error; and restarting sorting.

According to still another aspect of the invention there is provided an error control method for a sorter system, which includes immediately interrupting sorting in sort elements in all the stages when one of the sort elements detect a sort disable error; reporting the contents of an error; analyzing the error; and directing the sort data stream from the sort element $P_{j-1}$ to the sort element $P_{j+1}$ by skipping the sort element $P_j$ which is found faulty in the above analyzing step, thereby continuing the sort process.

According to yet another aspect of the invention there is provided an error control method for a sorter system, which includes interrupting sorting in sort elements in all the stages upon completion of sorting when one of the sort elements detects a sort allowable fault; reporting the contents of an error; analyzing the error; and directing the sort data stream from the sort element $P_{j-1}$ to the sort element $P_{j+1}$ by skipping the sort element $P_j$ which is found faulty in the above analyzing step, thereby continuing the sort process.

The above and other objects, features, and advantages of the invention will become more apparent from the following description when taken in conjunction with the accompanying drawings.

DESCRIPTION OF THE PREFERRED EMBODIMENT

Figure 1:
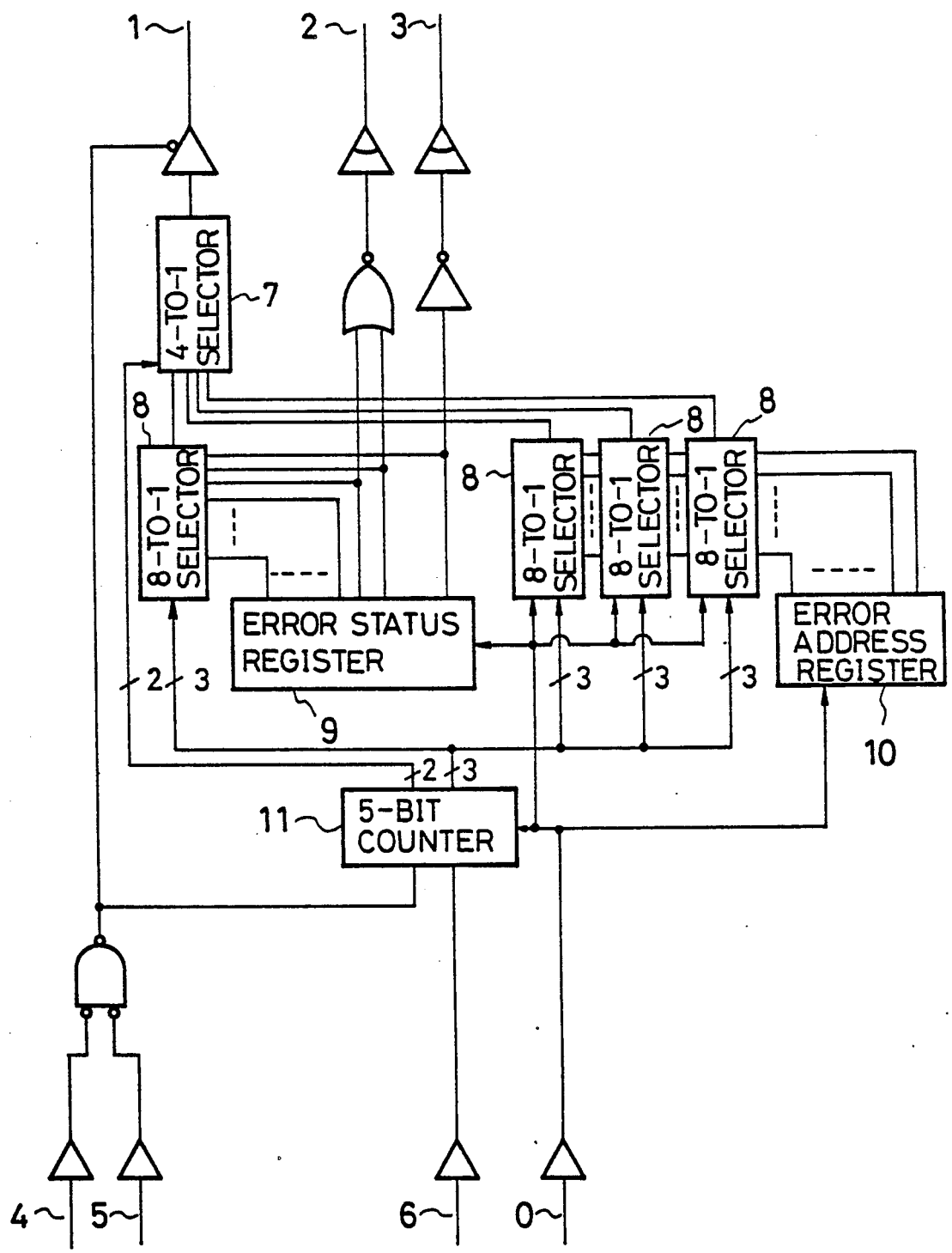
FIG. 1 is a block diagram of an error processor in a sort element employing an error collection method according to an embodiment of the invention.
Figure 7:
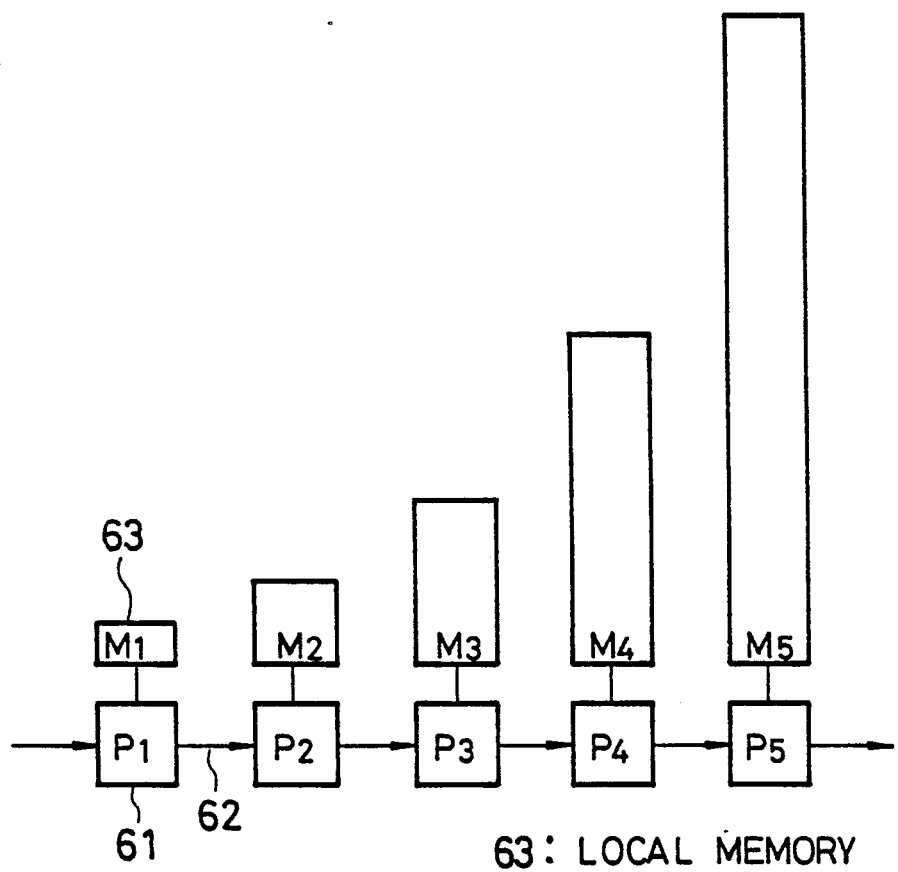
FIG. 7 is a block diagram of a hardware sorter system.
Figure 8:
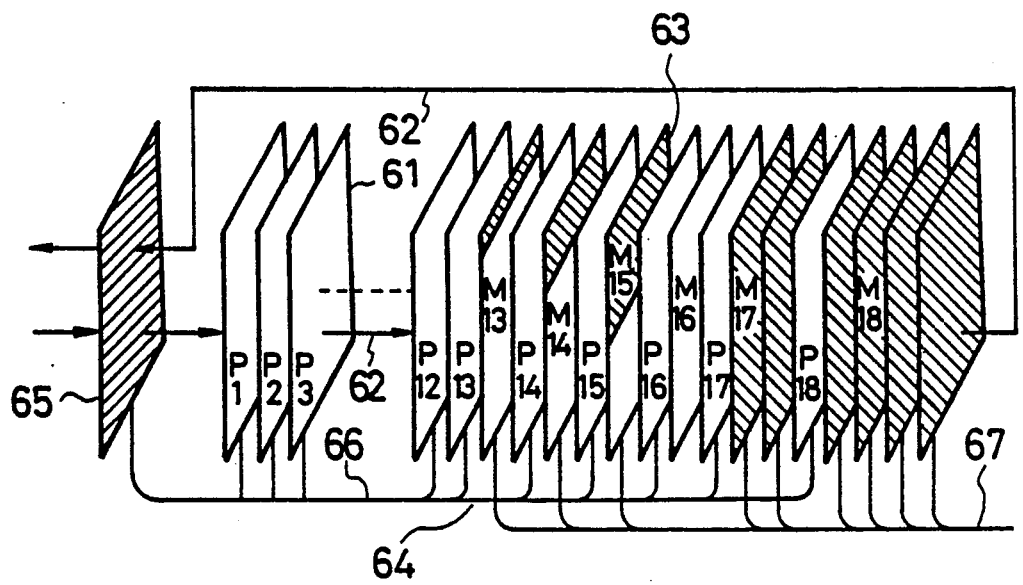
FIG. 8 is a perspective view of the hardware sorter system of FIG. 7.

The organization of a sorter system is shown in FIG. 7 so that it is not repeated here. In FIG. 1, a reset signal 0 is provided to reset the sort element. A status signal 1 indicates the contents of an error status register. An error "1" signal 2 means a fault which disables the continuation of sorting. An error "0" signal 3 means a fault which allows the continuation of sorting. A halt signal 4 temporarily stops all the sort elements. A select signal 5 designates a specified sort element. A read signal 6 is a strobe signal for reading the status signal 1. The error processor includes a 4-to-1 selector 7, 8-to-1 selectors 8, an error status register 9 for storing error status signals, an error address register 10 for storing error address signals, and a 5-bit counter 11, all interconnected as shown in FIG. 1.

Figure 2:
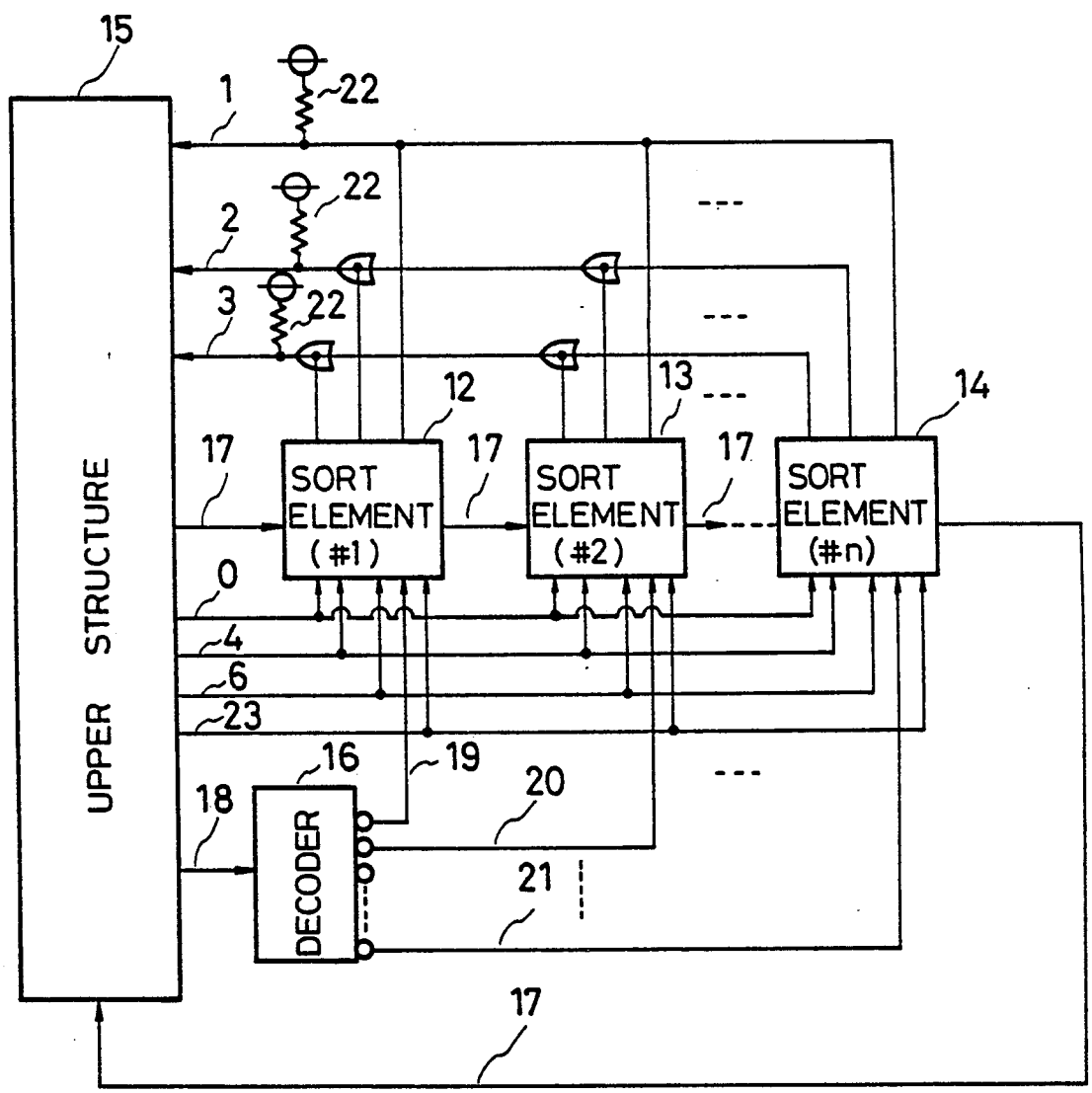
FIG. 2 is a block diagram of a sorter unit consisting of n sort elements linearly connected or pipelined.

In FIG. 2, the pipelined sort elements are connected to the upper structure. The sorter unit includes the first-stage sort element 12, the second-stage sort element 13, the n-th stage sort element 14, an upper structure or sort driver 15, a decoder 16 for decoding an LSI sort element select signal 18 of several bit length to designate respective sort elements 12, 13, . . . , 14, and a data bus 17 through which the records to be sorted are transmitted. Sort element select signals 19, 20, . . . , 21 are the decoded outputs of the LSI select signal 18. Pull-up resistors 22 are provided to stabilize the levels of tristate and open collector outputs. A reference clock signal 23 is provided to synchronize signals, such as "0", "4", and "6", to the respective sort elements 12–14 from the upper structure 15.

The hardware sorter of this embodiment is the same as that of FIG. 7, and it is not repeated here.

The operation is described. In FIG. 1, when the halt signal 4 and the select signal 5 are made significant, the output of the 4-to-1 selector 7 which is a fault information bit selector is connected to the status signal 1. Consequently, the sort elements 12–14 are connected to the status signal 1 in a multidrop fashion as best shown in FIG. 2. When a sort element detects a fault, the error "1" signal 2 or the error "0" signal 3 are made significant at the tailing edge of a cycle of the basic clock signal 23. Upon reception of the error "1" signal 2, the upper structure 15 makes the halt signal 4 significant to stop the sort elements. Upon reception of the error "0" signal 3, on the other hand, the upper structure 15 does not make the halt signal 4 significant to stop the sort elements until the sorter system completes the sort process. The upper structure 15 then reads fault information from the registers 9 and 10 of the stopped sort element in a bit serial fashion in synchronism with the read signal 6. The fault contents of the bit information are switched one bit whenever the read signal 6 is transmitted. The above procedure is repeated for the n stages of the sort elements #1 to #n. This operation is carried out until all of the bits in the registers 9 and 10 are read for the sort element to which the fault is reported. Where no fault information is contained, only the error status bit of the error status register 9 is read, and no local memory address is read when an ECC error takes place.

Figure 3:
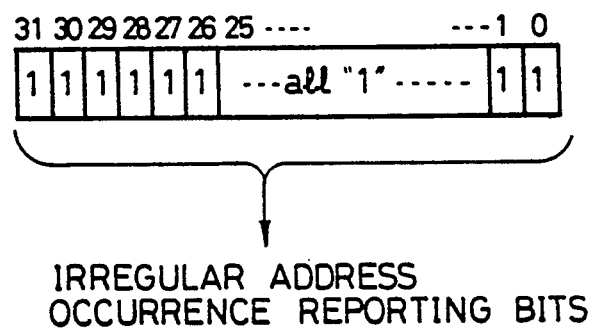
FIG. 3 shows the contents of a status signal when an irregular address is generated upon access to a local memory in the above embodiment.
Figure 4:
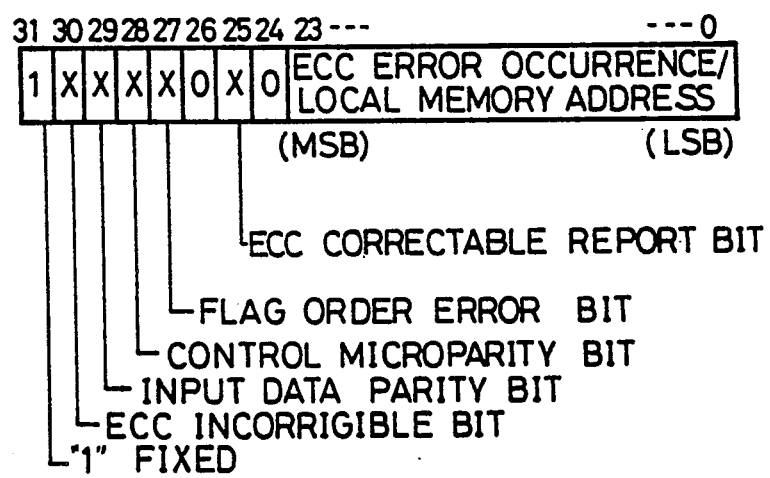
FIG. 4 shows the contents of a status signal when no irregular address is generated in the above embodiment.

In FIGS. 3 and 4, the fault information is expressed in bit units. The occurrence of an irregular address in a local memory is determined by the left-most leading bit. Similarly, every bit is given some meaning.

Figure 5:
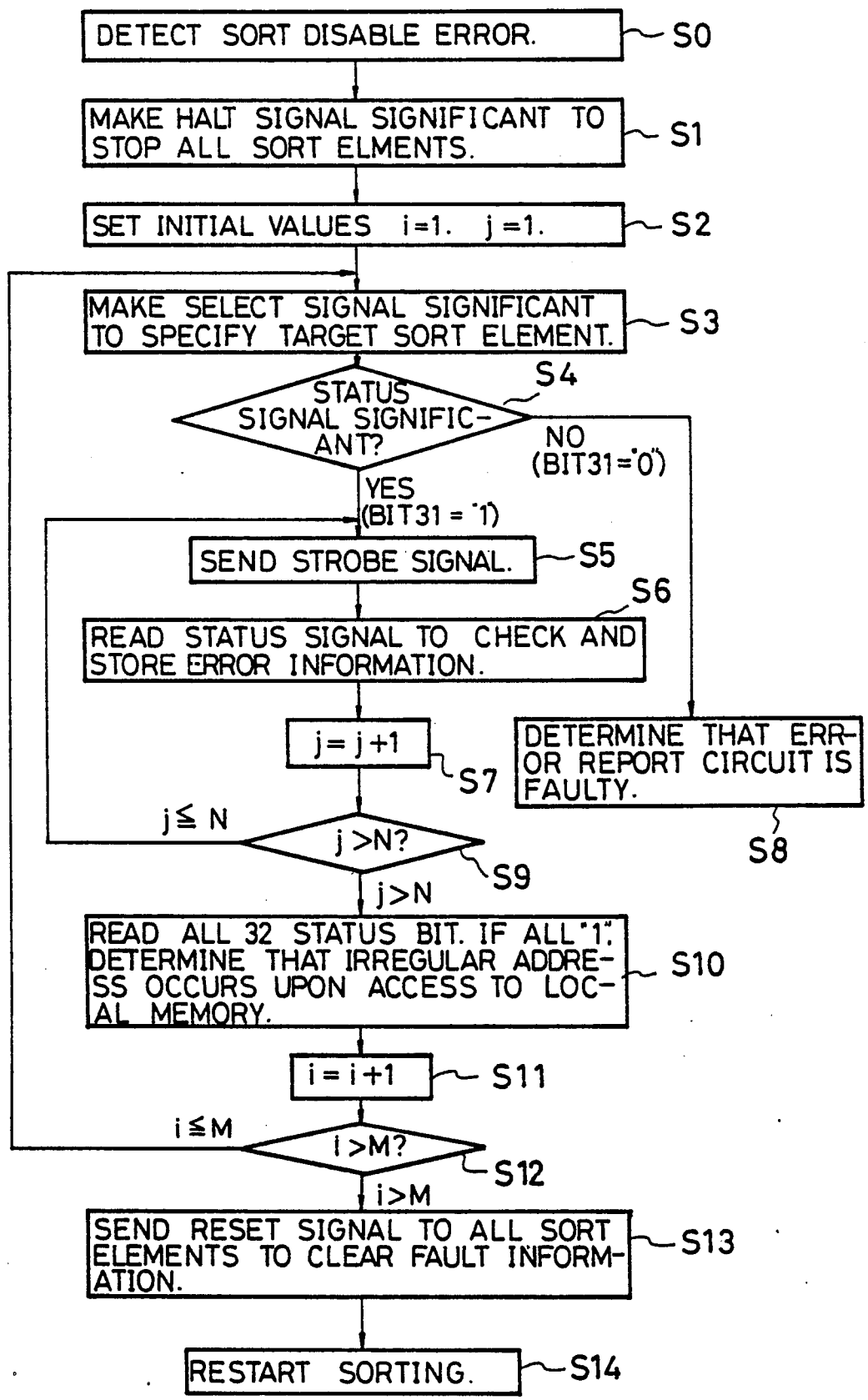
FIG. 5 is a flowchart showing how the upper structure read the contents of an error.

In FIG. 5, the procedure for reading the contents of an error after report of the error in the sorter unit is shown. When the occurrence of a sort disable error which disables the continuation of sorting is detected (step S0), the upper structure 15 makes the halt signal 4 significant to stop all the sort elements 12–14 (step S1) and sets at "1" both a variable i for investigating the stage of a sort element and a variable j for investigating the bit number stored in the error status register 9 (step S2). Then, the select signal 5 is made significant to specify the target sort element $P_i$ (step S3). When the status signal 1 is found significant (step S4), the upper structure 15 sends the strobe read signal 6 (step S5), reads the bit serial status signal 1 in a bit serial fashion to check and store the error information (step S6), and increments the variable j by one (step S7).

When the status signal 1 is found insignificant in the step S4, it is determined that the error report circuit itself is faulty (step S8).

When the variable j is found equal to or less than the number of all bits N in the error status register 9 (step S9), the process is returned to the step S5.

When the variable j is greater than the number of bits N, all 32 status bits are read. If all of them are "1", then it is determined that an irregular address takes place upon access to the local memory (step S10). If not all of them are "1", then the variable i is incremented by one (step S11).

When the variable i is found equal to or less than the number of all stages M (step S12), the process is returned to the step S3, with j=1.

When the variable i is greater than the number of stages M, the reset signal 0 is sent to all the sort elements 12–14 to clear the fault information from the sort elements (step S13), and sorting is restarted (step S14).

Sort elements $P_i$, each having five input/output signal pins for error "0" signal, error "1" signal, status signal, select signal, and read signal and an error information storage register, are pipelined. The error signals "1" and "0" on the two open drain outputs 2 and 3 of each sort element are wired OR to provide each report to the upper structure 15 in the sorter system. The status signal 1 on the tristate output of each sort element is connected to the upper structure 15 via a bus to report the contents of an error in the sort element. Upon reception of the report, the upper structure 15 collects and analyzes the error.

With the above embodiment, a given number of sort elements are able to provide simultaneous error reports to the upper structure 15 via the above wired OR connection. The above bus connection makes it possible to report in sequence the error contents of a specified sort element. According to the above embodiment, a path for collecting fault information and a register for storing error information are provided in the sort element and a path is provided between the upper structure and each sort element to report an error to the upper structure such that the report time is discriminated according to the degree of a fault (whether it is possible to continue sorting or not), permitting the upper structure to collect, analyze, and determine the detected fault information.

Figure 6:
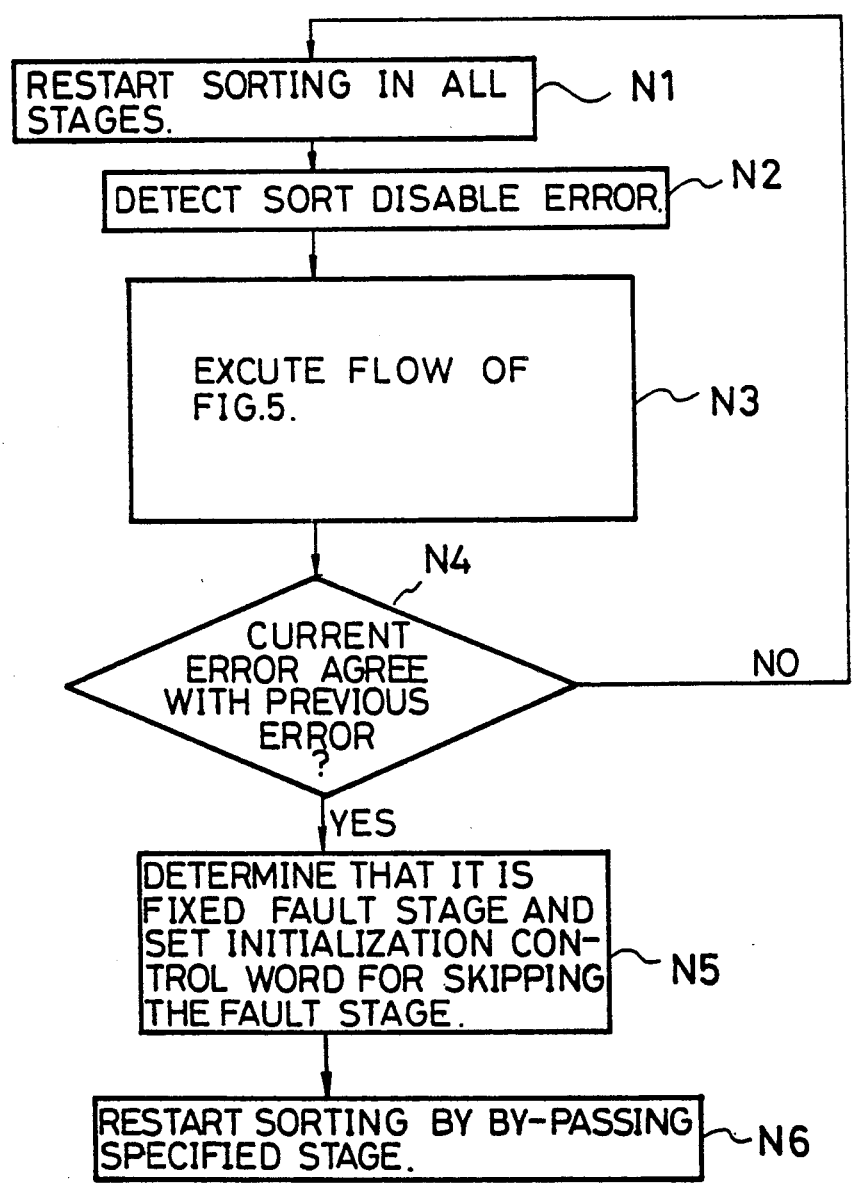
FIG. 6 is a flowchart showing how to generate a flag to perform fault-stage skip control.

In FIG. 6, the procedure for generating a flag for the skip control of a faulted stage is shown. Sorting is restarted in sort elements in all the stages (step N1). When a sort disable error takes place (step N2), the flow of FIG. 5 is executed (step N3). If the error after restart agrees with the previous error (step N4), a fixed fault stage is determined, and a control word for initializing a faulted stage skip process is set (step N5), and the sorting in which the specified stage is by-passed is restarted (step N6).

The overall operation is described. According to the flow of FIG. 5, the upper structure 15 reads the contents of an error in the sorter unit which includes sort elements and local memories. The error contents are stored corresponding to the respective sort elements $P_i$. When the report of error contents is completed for all the sort elements, a reset signal 0 is inputted to all the stages of the sorter unit to restart sorting. When a sort disable error takes place, the report and storage of error contents are carried out according to the flow of FIG. 5. If the contents of an error do not agree with the previous ones, sorting is started again in all the stages according to the flow of FIG. 5.

If the contents of an error agree with the previous ones, a fixed fault is found, and an initialization control word which established a flag for preventing sorting in the target sort element $P_j$ is set to restart sorting. That is, the initialization control word is right shifted by one bit in the sort element $P_i$ and sent to the sort element $P_{i+1}$. For example, the specified word for initialization is set at 0004 (H) in order to skip only the third stage and at 0010 (H) in order to skip only the fifth stage. When the specified word is set at 000F (H) so as to start sorting from the fifth stage skipping the first stage through the fourth stage, the sort element $P_i$ starts reading from the right-most LSB and shifts bit by bit so that each sort element $P_i$ decides whether sorting is possible or not in its stage by looking at the presence or absence of a bit. That is, if there is a bit (=1), the sort element skips the sorting and sends the record to the next stage. If there is no bit (=0), the sort element performs sorting and sends the result to the next stage. In this way, the faulted stage by-pass mechanism is built.

As has been described above, the sorter unit is equipped with a fixed fault stage by-pass mechanism which has five signals (error "0", error "1", status, select, and read) for reporting a fault therein and the contents to the upper structure 15, in which the specified word in the record initialization control word which indicates the leading head of sort records is shifted one bit for each transfer to the next stage of the pipelined sort elements, and, by setting the specified word in the input record initialization control word so as to by-pass the j stage for the sort element $P_j$ which is determined to have a fixed fault by the upper structure which has received a fault report from the sorter unit, sorting is skipped to the sort element $P_{j+1}$ from the sort element $P_{j-1}$ by omitting the sort element $P_j$ to continue the sort process.

In other words, it is possible to continue the sort process by pipelining n sort elements $P_i$, each having five input/output pins for collecting fault information, wiring OR the error signals at the two open drain outputs of each sort element to report an error in the sorter unit to the upper structure 15, connecting the error status signal at the tristate output of each sort element to the upper structure 15 via buses from all the stages to report the contents in response to the error status read in each stage from the upper structure 15, and directing the sort data to the next stage without any modification by skipping the stage which is found faulty by the upper structure 15.

With the above embodiment, the error processing system in the hardware sorter unit having sort elements pipelined is divided into two groups according to the contents of an error; one requiring immediate error analysis and the other requiring no immediate error analysis. By reading the error register of a sort element in each case, it is possible to provide not only an easy error process without losing any versatility but also an easy error analysis in the upper structure. When a sort element or part of a local memory has a fixed fault, the faulted stage is skipped to continue the sorting process so that there is no need for replacement of the faulted device, thus expanding the RAS function of the sort unit.

The sort disable faults include multiple errors in the local memory ECC, parity errors in input data and control microprogram, flag order errors, and irregular addresses (address over) to the local memory. The RAS function may be expanded by doubling the register of a sort element or adding a parity bit to the data bus. The error address information may be expanded to the address of an internal register in addition to the irregular address of a local memory and the local memory address of an ECC error. The fault stage by-pass mechanism is effective to the fixed fault of a local memory in addition to the fixed fault of a sort element so that it may be used for diagnosing the system at the time of system IPL to produce the substantially same results as in the above embodiment.

As have been described above, according to one aspect of the invention, even if the types and characteristics of an error increase with the number of sort element stages, it is possible to simplify the error process without losing the general properties of a parallel machine. If there is a fault on the data bus between sort elements, the bus parity check is useful during collection of the irregular fault information. In addition, it is easy to analyze errors in the upper structure, thereby expanding the RAS function.

According to another aspect of the embodiment, it is possible to simplify the process of an error report to the upper structure. In addition, even if the sort element of a middle stage becomes faulty, it is possible to continue sorting.

We claim:

1. An error collection method for a sort element unit having n pipelined sort elements Pi (i=1−n) of the same type and n local memories Mi (i=1−n) each connected to corresponding said sort element and having a memory capacity of at least $2^{i-1}$ record length, which comprises the steps of:
   feeding said n sort elements with a control word prior to a sort record so that each sort element determines whether sorting is possible or not;
   immediately stopping sorting in said sort elements when one of said sort elements Pj detects a sort disable fault, wherein j is a stage number;
   reporting contents of an error to an upper structure;
   analyzing said error in said upper structure; and
   directing a sort data stream from a sort element Pj−1 to a sort element Pj+1 skipping said sort element Pj which has been found faulty in said analyzing step to continue sorting, said sort element Pj receiving said sort record but transmitting said sort record to the next sort element without sorting, thus skipping itself in terms of sorting.

2. An error collection method for a sort element unit having n pipelined sort elements Pi (i=1−n) of the same type and n local memories Mi (i=1−n) each connected to corresponding said sort element and having a memory capacity of at least $2^{i-1}$ record length, which comprises the steps of:
   feeding said n sort elements with a control word prior to a sort record so that each sort element determines whether sorting is possible or not;
   stopping sorting in said sort elements upon completion of sorting when one of said sort elements Pj detects a sort allowable fault, wherein j is a stage number;
   reporting contents of an error to an upper structure;
   analyzing said error in said upper structure; and
   directing a sort data stream from a sort element Pj−1 to a sort element Pj+1 skipping said sort element Pj which has been found faulty in said analyzing step, thereby continuing sorting, said sort element Pj receiving said sort record but transmitting said sort record to the next sort element without sorting, thus skipping itself in terms of sorting.

3. An error collecting apparatus for a sorter system which includes n sort elements which are pipelined and are of the same type and n local memories each having a memory capacity of at least $2^{i-1}$ record length, wherein i is a stage number, and being connected to each of said sort elements, said error collecting apparatus comprising:
   an upper structure capable of feeding said sort elements with a HALT signal for stopping their operation and a READ signal for reading their contents;
   a decoder connected to said upper structure to be responsive to a basic SELECT signal from said upper structure to generate a SELECT signal for designating one of said sort elements;
   said sort elements constructed so as to feed, upon occurrence of an error, said upper structure with a STATUS signal for indicating its conditions, a SORT DISABLE signal for indicating that continuation of sorting is impossible, and a SORT ALLOWABLE signal for indicating that continuation of sorting is possible; and
   said upper structure constructed so as to feed, as soon as one of said sort elements Pi generates said SORT DISABLE signal, all of said sort elements with said HALT signal and said sort element Pi with said READ signal so that said sort element Pi feeds back said upper structure with said STATUS signal.

4. The error collecting apparatus of claim 3, wherein said upper structure further constructed so as to cause, as soon as one of said sort elements Pi generates said SORT ALLOWABLE signal, said decoder to stop generation of said SELECT signal for designating said sort element Pi and permit the other sort elements to continue sorting.

5. The error collecting apparatus of claim 3, wherein said sort elements each comprise a status register for storing said STATUS signal.

* * * * *